United States Patent [19]

Byer

[11] Patent Number: 4,555,786
[45] Date of Patent: Nov. 26, 1985

[54] HIGH POWER SOLID STATE LASER

[75] Inventor: Robert L. Byer, Stanford, Calif.

[73] Assignee: Board of Trustees of Leland Stanford, Jr. University, Stanford, Calif.

[21] Appl. No.: 391,529

[22] Filed: Jun. 24, 1982

[51] Int. Cl.$^4$ .............................. H01S 3/091
[52] U.S. Cl. ................................. 372/70; 372/66; 372/34; 372/71
[58] Field of Search ......... 372/66, 67, 70, 34, 372/35, 71, 33, 26, 106, 72, 105

[56] References Cited

U.S. PATENT DOCUMENTS

| 3,423,692 | 1/1969  | Young ............................ 372/72 |
| 3,581,229 | 5/1971  | Martin ............................ 372/35 |
| 3,633,126 | 1/1972  | Martin et al. ................... 372/35 |
| 3,679,996 | 7/1972  | Almasi et al. .................. 372/35 |
| 3,679,999 | 7/1972  | Chernoch ........................ 372/35 |
| 3,810,040 | 5/1974  | Martin et al. ................... 372/35 |
| 3,810,041 | 5/1974  | Martin ............................ 372/35 |
| 4,150,341 | 4/1979  | Ferguson ......................... 372/35 |
| 4,207,541 | 6/1980  | Karger et al. ................... 372/35 |
| 4,233,567 | 11/1980 | Chernoch ........................ 372/35 |

Primary Examiner—William L. Sikes
Assistant Examiner—Léon Scott, Jr.
Attorney, Agent, or Firm—Harry E. Aine

[57] ABSTRACT

A kilowatt average power solid state laser employs a reciprocating slab of Nd:glass to effectively average the thermal loading thereof.

8 Claims, 4 Drawing Figures

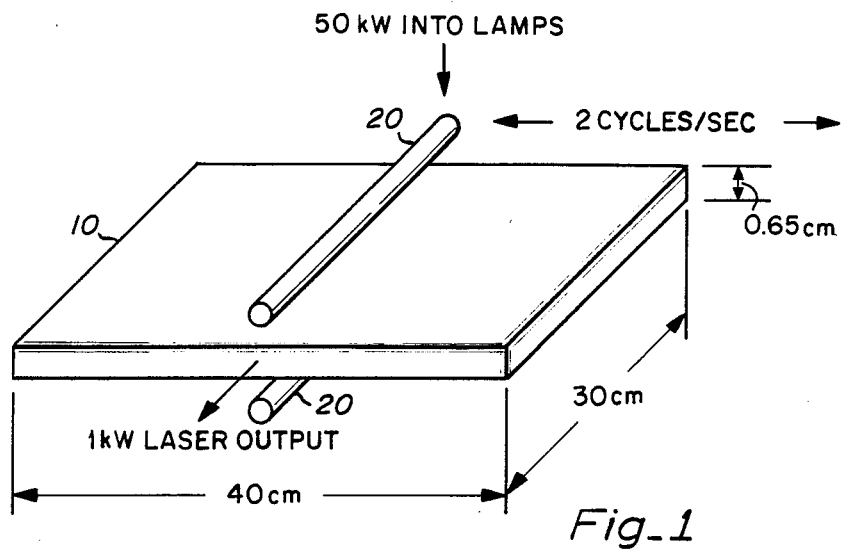
Fig_1
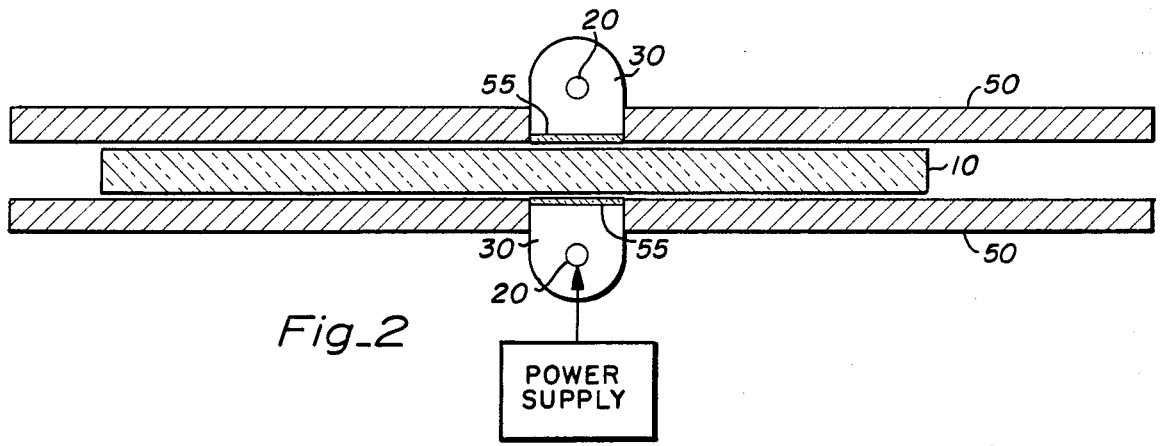
Fig_2
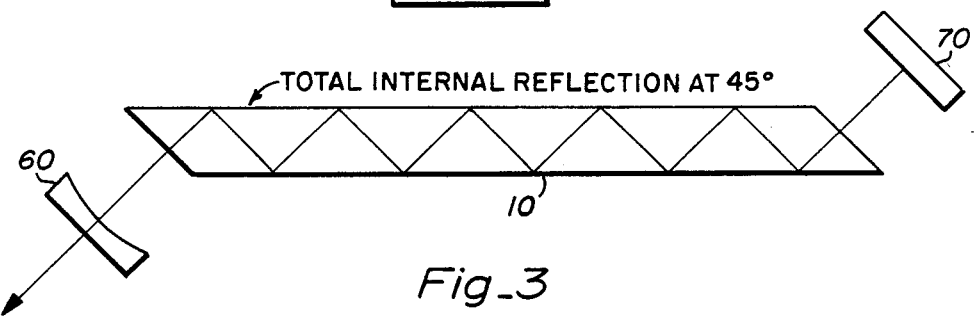
Fig_3
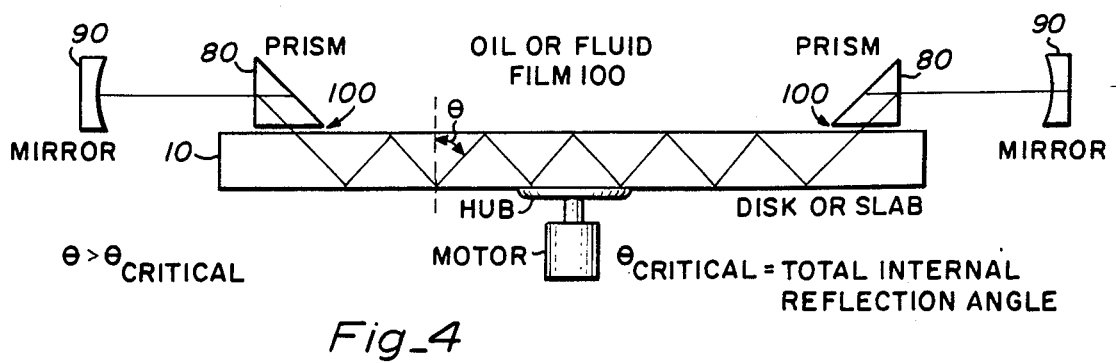
Fig_4

HIGH POWER SOLID STATE LASER

BACKGROUND AND SUMMARY OF THE INVENTION

This invention relates generally to lasers and more specifically to a solid state laser in the kilowatt average power class. Lasers, with their ability to concentrate energy at a point, are potentially very useful for such industrial purposes as cutting, drilling, and welding. In order to economically justify the use of a laser to perform these industrial functions, several criteria must be met. The laser and its power supply must be competitively priced and power efficient in comparison to conventional techniques. In addition, an average power in the kilowatt range is required for most metal working operations. Continuous wave or high repetition operation is required. Very high energy pulses at low repetition rates are not useful. Repetition rates near 100 hertz are reasonable. The laser beam must be focusable to small spots, near 50 micrometers. Beam wander must be on the same order. Finally, the laser must be of a reasonable size physically, and the emitted radiation must couple well to the material being worked. That is, it should be absorbed near the surface rather than being reflected or transmitted.

Presently, Transverse Electric Atmospheric (TEA) carbon dioxide lasers are the only kilowatt average power lasers in the industrial market place. They convert electrical energy into coherent radiation with an efficiency on the order of 10 percent. However, these prior art carbon dioxide lasers exhibit three distinct disadvantages that limit their broad utility in industrial applications. First, TEA carbon dioxide ($CO_2$) lasers require a power supply capable of delivering a very high voltage, typically 12,000 volts. Second, TEA lasers and their power supplies are physically bulky, requiring large amounts of valuable floor space. Typically, a TEA laser and its power supply occupy a space of 6 meters by 1 meter. Third, the 10.6 micron radiation produced by $CO_2$ lasers is not absorbed well by metals, but instead is reflected. It would be advantageous to provide a physically smaller kilowatt average power laser that is capable of operation at much lower power supply voltages in the range of 440 to 2400 volts and that emits radiation having an order of magnitude shorter wavelength to guarantee much better absorption by typical industrial metals. A comparison of the radiation absorption factors of various polished metals is shown in Table 1 below taken from the *Handbook of Physics*.

TABLE 1

| % Absorption | Cu | Al | Fe | Co |
|---|---|---|---|---|
| 1.0μ | 9.9 | 26.7 | 35.0 | 32.5 |
| 10μ | 1.6 | 3.0 | 6.0 | 3.2 |

High efficiency solid state lasers constructed of either glass or yttrium-aluminum garnet (YAG) doped with neodymium (Nd) are well known in the prior art. However, neither of these materials has been considered practical for the kilowatt average power application discussed above, but for different reasons.

The average power available from Nd:YAG is limited by the small size of growable cyrstals. The power from a crystal of fixed length is limited by the heat the crystal can dissipate without breaking from thermal stress. Yttrium-aluminum garnet is a crystal that is slow and expensive to grow. To date, it has been impossible to grow useful laser rods of dimensions greater than 10 millimeters in diameter and 150 millimeters in length. Few workers in this art are optimistic about improvements in YAG growth technology, though other crystalline hosts show some promise for big crystal growth. At the present time, though, the crystals are fixed at lengths of 15 centimeters. It can be shown that a YAG crystal will break from thermally-induced stress if the heat generated in the rod is greater than 115 watts per centimeter of length, regardless of the diameter of the rod. Since the heat generated is at least twice the useful power for conventionally pumped YAG lasers, the laser output is limited to about 60 watts per centimeter. Thus, a 15 centimeter rod has a maximum power output of 900 watts. This operating condition is very close to the stress fracture limit of the YAG and is not practical since the stress fracture limit of YAG varies from piece to piece. In addition, such an operating condition pushes the limit of arc lamp technology.

In the past, glass was rarely considered as a laser material in situations where high average power has been an objective. It is the material most persons skilled in the art associate with high energy per pulse and low repetition rates. The low thermal conductivity of glass makes high average power impossible with a conventional geometry. It is impossible to even approach continuous wave operation due to the low cross section for stimulated emission.

Low thermal conductivity in a laser rod means that for a given temperature difference between the center of the rod and the cooled edges, the rate of heat removal is low. The temperature difference, rather than the gradient, between the rod center and the surface is what leads to thermal stress in the rod. Thus, when thermal conductivity is low, thermal stress approaches the glass breaking point even though the rate of heat removal is low. The same equations that Koechner used to calculate the YAG heat dissipation limit can be used for glass. An LHG-5 rod will break when the heat dissipated by the rod exceeds 5 watts per centimeter of rod length, regardless of rod diameter. This fact alone would lead us to expect that a rod of length 4 meters would be required for a kilowatt laser, since again the ratio of waste heat in the rod to useful laser output exceeds two. A resonator of this dimension would be impractical.

The low cross section of Nd:glass results in low gain unless the rod is pumped very hard. It takes a powerful lamp pulse to reach the threshold of lasing in glass. Even more lamp energy is needed to reach the intensity required for saturation of the gain so as to obtain good energy efficiency. Since glass lasers of typical design are able to dissipate heat only slowly, yet require a large flashlamp energy with each pulse, only low average power, low repetition rate glass lasers are presently on the market. These devices do not meet the requirements for industrial materials processing lasers. Commercially available glass lasers generally specify repetition rates in pulses per minute, far from the approximately 100 pulses per second required of a laser successfully performing industrial operations.

Glass has two potentially major advantages in high average power laser design. First, glass can be produced in large pieces of excellent optical quality. Pieces of glass used for fusion lasers are as large as one meter square and are finished to tenth-wave flatness. The cost of the glass to make these large slabs is significantly less than the cost of crystals. The average power of glass lasers is not limited by material fabrication problems, as are YAG lasers. Second, there is a potential for efficiency from glass that is not possible in YAG. Glass at high dopings can absorb a larger fraction of the pump light than can Nd:YAG, which cannot be doped more than one atomic percent because of crystal growth problems. Glass at 7 percent doping has been claimed to have an efficiency of 6.4 percent. Lasers using YAG do not exceed 3 percent efficiency.

The problem that has prevented the use of glass as a lasant material in the prior art design of high average power lasers has been that of heat removal from the glass, which characteristically cools very slowly. It is therefore the principal object of the present invention to provide an Nd:glass high average power laser in which the gain is concentrated in a small portion of a slab of glass while the heat generated thereby is distributed throughout the entire slab of glass. This and other objects are accomplished in accordance with the illustrated preferred embodiment of the present invention by moving the glass slab relative to the beam, always keeping a portion of the slab between the flash lamps but at the same time ensuring that any given portion of the slab is subjected to the output of the flash lamps for only a small fraction of the motion cycle.

DESCRIPTION OF THE DRAWINGS

FIG. 1 is a diagram illustrating typical parameters required of a slab of Nd:glass to provide a kilowatt average power laser constructed in accordance with the present invention.

FIG. 2 is a diagram illustrating a preferred arrangement for cooling the slab of FIG. 1.

FIG. 3 is a diagram illustrating the resonator configuration and beam path for the slab of FIG. 1.

FIG. 4 is a diagram illustrating an alternative arrangement for coupling the laser beam out of the slab of FIG. 1.

DESCRIPTION OF THE PREFERRED EMBODIMENT

Referring now to FIG. 1, there is shown a slab of highly doped Nd:glass 10 having a geometry designed to provide an average power of 1000 watts. The design geometry may, of course, be scaled in either direction to obtain other desired average power outputs. The following design parameters are based upon the assumption that when the glass is well saturated, the overall efficiency of the laser is two percent. Thus, in order to obtain one kilowatt of average power output, an input power of 50 kilowatts is reqired. Of course, this input power may be lower in the event a higher efficiency is achieved for highly doped glass. Slab 10, as illustrated, has dimensions of 0.65 centimeters thick, 30 centimeters long (the direction of beam path), and 40 centimeters wide (the direction of slab motion). These dimensions will permit dissipation of the 50 kilowatts of heat necessary to obtain one kilowatt of average power output without reaching the thermal stress breakage point of the glass. Two 25-kilowatt flash lamps 20, each having a length of 30 centimeters and an inner diameter of 8 millimeters, are positioned adjacent slab 10 such that one is above the slab and the other is below the slab. Each of flash lamps 20 is positioned within a reflector structure designed to maximize the focusing of the flash lamp light output into the portion of slab 10 between the laser mirrors. Flash lamps 20 are arranged to be powered by a pulse forming network driven by a DC power supply operating at 2400 volts. If a lower voltage power supply is more convenient in a given application, a larger number of shorter flash lamps may be used to obtain the same flash lamp power, since the charging voltage required is proportional to the individual lamp length. However, the larger number of flash lamps results in increased complexity of the required reflector structure. The pulse forming network is arranged to deliver pulses of approximately 330 microseconds in length at a repetition rate of 300 hertz, representing a duty cycle of approximately ten percent. The reciprocating motion of slab 10 preferably has a period of two seconds.

Referring now to FIG. 2, it is shown that flash lamps 20 may be enclosed within an elliptical cavity 30 through which water flows for the purpose of cooling the flash lamps 20. Slab 10 is cooled by an advantageous gas conductive cooling method that is described in detail hereinbelow. Basically, a helium layer 40 on the order of 0.3 millimeters in thickness thermally couples slab 10 to a metal such as water-cooled aluminum sheet 50. An optically transparent plate such as pyrex plate 55 serves to separate the water flowing within each of elliptical cavities 30 from helium layer 40, while at the same time permitting the light output from each of flash lamps 20 to be focused upon a portion of slab 10. Symmetrical cooling systems of the type just described are preferably positioned adjacent both the top and bottom surfaces of slab 10, as illustrated in FIG. 2.

Referring now to FIGS. 3 and 4, it is shown that the laser beam follows a zig-zag path through glass slab 10, with the angle between the glass surface and the beam equal to 45 degrees. The beam strikes the entrance surface to the slab 10 at normal incidence. Total internal reflection confines the beam to the slab. As illustrated in FIG. 3, an output mirror 60 is curved, while a back mirror 70 is flat. An alternative method for output coupling that involves significantly lower fabrication costs is illustrated in FIG. 4. According to that alternative method, a pair of prisms 80 are optically coupled to the face of slab 10 by way of an index matching fluid 100 such as oil. The use of a fluid as an index matching medium permits motion of slab 10 relative to the prisms 80, whereas other known index matching compounds such as optical cement would not. A curved output mirror 90 is employed in connection with each of prisms 80.

The design choices and parameters generally described above will now be described in detail. The properties of Nd:glass (such as Kigre Q-100) assuming $7 \times 10^{20}$ atoms/cubic centimeter (6.5% Nd+ doping) are shown in Table 2 below.

TABLE 2

| | | |
|---|---|---|
| Cross section for stimulated emmission | $\sigma$ | $4.4 \times 10^{-20}$ cm$^2$ |
| Upper level lifetime | $\tau_v$ | $190 \times 10^{-6}$ seconds |
| Laser photon energy | $\lambda\nu$ | $1.88 \times 10^{-19}$ joules |
| Laser level energy above ground | $E_L$ | $0.39 \times 10^{-19}$ joules |
| Thermal expansion coefficient | $\alpha$ | $96 \times 10^{-7}$ K$^{-1}$ |
| Thermal conductivity | k | 0.0082 watts/K-cm |
| Young's modulus | E | 715,000 kg/cm$^2$ |
| Heat capacity | C | 2.56 joules/K-cm$^3$ |
| Poisson's ratio | $\nu$ | 0.24 |
| Nd+ concentration | N | $7 \times 10^{20}$ atoms/cc |
| Index of refraction | n | 1.555 |
| Safe surface tension | $\sigma_b$ | 200 kg/cm$^2$ |
| Loss due to scattering | | 0.0008 cm$^{-1}$ |

First, it is important to understand the three factors limiting the power output from a slab of Nd:glass of specified dimensions. There is a limit on the power that can be applied to a flash lamp without shortening its life significantly. In the case of a flash lamp of 8 millimeters bore, this limit is near 2.2 kilowatts per inch. Thus, if it is desired to obtain one kilowatt of output power from a slab of glass with a flash lamp on each face, a slab of glass 11.4 inches (about 30 centimeters) long, in the direction parallel to the flash lamps, is required if an efficiency of two percent is assumed. Therefore, the slab length parallel to the beam is determined by flash lamp technology. Next, thermal-optical effects impose a constraint on glass rod geometries. The wide slab geometry selected in accordance with the illustrated preferred embodiment of this invention eliminates these effects. The thermally induced optical problems are depolarization and focusing. In an infinitely wide, evenly heated and cooled slab, in which the beam follows a zig-zag path as illustrated in FIGS. 3 and 4, both of these problems are completely eliminated in the case of a beam polarized parallel or perpendicular to the slab face. Focusing is eliminated for any polarization of the beam. As shown hereinbelow, the 0.5 hertz frequency of reciprocating glass motion results in an essentially even thermal distribution. The infinite result is well approximated. Except for the point at which the direction of motion of the glass changes, there will be no thermally induced optical effects. This edge problem can be eliminated by the spinning disk design, discussed below. Last, thermal stresses may break a glass rod. Stresses are produced because the interior of the glass is hotter than the surface, but the interior cannot move relative to the surface. Thus, the surface is stretched while the center of the slab is compressed. The stress distribution can be calculated analytically for a slab of isotropic material that is heated evenly at all points in the interior and cooled evenly on the exterior. The result for stress on the surface is given by $$\sigma = \alpha E q t / 12 k (1-\nu)$$

where $\sigma$ is stess in kilograms/centimeter$^2$, E is Young's modulus in kilograms/centimeter$^2$, q is heat creation per unti area of slab in watts/centimeter$^2$, t is full slab thickness in centimeters, k is thermal conductivity in watts/centimeter-degree Centrigrade, $\nu$ is Poisson's ratio. The heat deposited per unit volume is about four times the extractable energy per unit volume. The fracture stress is variable from sample to sample, and is not predictable for any particular piece, but a tensile stress at the surface of 200 kilograms/centimeter$^2$ is considered safe. In the present design, glass fracture is a concern that determines the choice of the remaining two slab dimensions. If the total heat input to the slab is considered fixed, and if the slab length is known, the manipulation of the above equation for stress yields $$W/t = \alpha E Q / 12 k (1-\nu) L \sigma_b$$

where W is the width in centimeters of the slab in the dimension perpendicular to the beam, Q is the total heat in watts created in the slab. L is the length in centimeters of the slab in the dimension parallel to the beam, and $\sigma_b$ is the fracture stress of glass in kilograms/centimeter$^2$. For safety in handling of the slab, and to obtain an output beam of reasonable size, a slab thickness of 0.65 centimeters is preferred. Given that thickness, a slab of 40 centimeters in width with spread the heat sufficiently to yield a surface tension of 135 kilograms/centimeter$^2$.

Second, it is important to understand the relationship between slab motion cycle time and the thermal stess in the glass slab that is caused by temperature differences within the slab. Temperature differences in any dimension except the direction perpendicular to the large face also cause forcusing of the laser beam because there is a significant change in index of refraction with temperature for most laser glasses. The zig-zag path of the beam eliminates only the effect of the temperature difference between slab face and slab center. In order to spread the stress evenly over the entire slab, and to minimize focusing effects, it is preferable that the temperature differences between any two points on the face of the slab be small compared to the difference between the face and the center. A point on the slab must not be allowed to cool much before it is again between the flash lamps, receiving more heat. In other words, the thermal time constant of the slab must be long compared to the cycle time of the slab motion. Thermal time constant is generally defined as $$\tau = Q/\dot{Q}$$

where $\tau$ is the time constant in seconds and $\dot{Q}$ is the rate of heat loss in watts/second. In the case of an infinite slab, assuming perfect cooling of the surfaces and even heating of the interior, the thermal time constant is given by $$\tau = Ct^2/12k$$

wherein C is the heat capacity of glass in joules/cm$^3$-degrees Kelvin. By perfect cooling, it is meant that the temperature of the slab face is fixed at the temperature of the coolant. In the case of gas cooling, this is not so. Soft cooling, such as provided by gas, leads to an increase in the thermal time constant.

The values chosen herein for the slab dimensions results in a thermal time constant of 8.2 seconds. A motion cycle time of two seconds is thus reasonable and easy to implement. At the extreme of each motion cycle, motion of the slab is reversed. If the heat deposited at the point of motion reversal is not to exceed the heat deposited at other places in the slab, the motion reversal must occur quickly. That is, it must occur in about as much time as it takes a point on the slab to pass by the light emitting region of the flash lamps. In the present design, This requires an acceleration of 25 meters/second$^2$, or about 2.5 times the force of gravity. A spring or other elastic bumper may be useful in assisting the motor moving the slab to accomplish this quick motion reversal.

Alternatively, a spinning glass disc may replace the rectangular glass slab and would eliminate the need for motion reversal as well as any non-uniformities in the slab that might cause the beam to vary with time. The disc 10 is held by a hub and driven in a circular path by means of a motor (see FIG. 4). As a further alternative the glass slab may be formed into a cylinder and rotated about its axis of symmetry with the beam passing longitudinally through the annulus.

Third, it is important to understand the advantages of the chosen 45-degree total internal reflection slab geometry and zig-zag beam path. As described above, essentially complete elimination of focusing the depolarization results from zig-zag propagation of the beam through a slab that is very wide compared to the beam width. In addition, highly doped glass is optically fairly thick for the most easily absorbed wavelengths of the pump light. More light is absorbed near the surface of the slab, so a ray going straight through the center of the slab sees lower gain than a ray near the surface. A zig-zag path eliminates this problem, since any ray spends some of its time in the center and some near the surface of the slab. For efficient extraction of stored energy, it is desirable to have a high intensity of photons inside the laser material. By zig-zagging through the slab at a 45-degree angle, it is possible to double the intensity of the laser beam inside the slab without using any focusing optics, and without increasing the intensity on any surface. This can be seen clearly by noticing that any point in the slab sees the beam twice. It is also possible to fit a beam into the slab that is wider by the square root of two than the beam that could travel parallel to the slab. This allows for thinner slabs with their higher capacity to dissipate heat without breaking.

The intensity doubling that is possible when total internal reflection takes place at angles near 45 degrees deserves some comments that go beyond the immediate design problem at hand. Although there are definite advantages to the present design, this method of intensity doubling would be of greater value in the face of the problem of surface fluence damage near the saturation fluence. This is the case for Q-switched glass lasers and other lasers of low cross section, such as the Alexandrite laser. For these materials, a doubling of intensity in the laser medium will allow greater energy extraction without increasing the chance of damaging optics. The effect is the same as if the saturation intensity or fluence were halved.

Zig-zag propagation is only possible if there is total internal reflection. Total internal reflection at 45 degrees is possible only if the following conditions is met:

$$n_1/n_c > \sqrt{2}$$

where $n_1$ is the index of refraction of the laser material and $n_c$ is the index of refraction of the coolant. For glass, this condition can be met if gas cooling is used, since glass has an index of 1.53 while that of all gases is about unity. In the case of crystal laser hosts, gas cooling is not useful except in very special cases. However, in the case of water, having an index of 1.33, it is possible to reach angles close to 45 degrees for YAG or Alexandrite.

Fourth, it is important to understand the advantages of helium conductive cooling of the slab. Helium conductive cooling of the glass slab, but not the flash lamps, is possible because 90 percent of the energy applied to the flash lamps results in heat in the flash lamps and the flash lamp reflector cavity. This is not because the flash lamps are inefficient light producers; rather, it is due to the fact that the Nd+ ions are not efficient absorbers of all the wavelengths of light produced by the flash lamps. Helium conductive cooling of the glass slab is advantageous in that it simplifies the design of the seals and the mechanical system. Small leaks are not a problem, and neither is coolant in the beam. The bearings that permit reciprocal motion of the slab will be simpler if there is no cooling water present. In addition, a 45 degree zig-zag angle is possible only if the coolant has an index near unity, as helium does. Helium conductive cooling is advantageous because it is soft cooling. That is, the thermal conduction of the helium layer is close to that of the glass slab itself. This means that the temperature of the surface of the glass will not be fixed at the coolant temperature, but rather will rise and fall with the temperature of the glass slab as a whole. Recalling that it is temperature differences that lead to stress, it will be appreciated that a short interruption of coolant flow followed by its resumption will not lead to thermal shocking and thus breakage of the glass. This is a definite advantage when the steady state stresses are near the fracture limit.

The glass temperature reached using helium conductive cooling can be calculated very easily, since none of the difficulties that arise because of gas convection need be considered. Any convection can only increase the cooling. The temperature of the glass at the center of the slab is given by $$T_C = T_{Cu} + \Delta T_{He} + \Delta T_S$$

where $T_C$ is the temperature at the center of slab, $T_{Cu}$ is the temperature of the water-cooled aluminum, $\Delta T_{He}$ is the temperature difference across the helium layer, and $\Delta T_S$ is the temperature difference between the slab surface and the center thereof.

It is assumed that the temperature of the aluminum sheet is fixed at the temperature of the coolant water supply, approximately 35 degrees Centigrade. The temperature difference across the helium is then calculated using the simple conductive relation $$h = k\Delta T_{He}/\Delta x$$

where he is the heat flow in watts/centimeter$^2$, k is the thermal conductivity of helium, and $\Delta x$ is the thickness of the helium gap in centimeters. This results in a heat flow of 5000 watts through an area of $0.3 \times 0.4$ meters $\times 2 = 0.24$ meters$^2$. Thus, the value of q is 20,800 watts/meter$^2$. The thermal conductivity of helium is 0.18 watts/meter-degree Centigrade, about six times that of air. Conductivity of gases is not sensitive to pressure, so the helium would be at one atmosphere. With a gap of 0.3 millimeters, $\Delta T_{He} = 35$ degrees Centigrade.

The difference in temperature between the center and edge of the slab is given by $$\Delta T_S = qt/8k$$

where q is the heat deposited per unit area of slab in watts/centimeter$^2$, t is the thickness of the glass slab in centimeters, and k is the thermal conductivity of glass in watts/centimeter-degrees Centigrade. In the present design, 5000 watts is dissipated over an area of 1200 centimeters$^2$. In that case, the value of q=4.2 watts/centimeter$^2$. The resulting temperature difference between the slab surface and center is given by $\Delta T_S = 35$ degrees Centigrade. Thus, the temperature at the center of the slab is 105 degrees Centigrade, an acceptable limit. Based on the previous calculations, helium conductive cooling is preferred for stationary slab lasers. The coupling would be to a thin layer of glass and then to the flash lamp coolant. If a low slab temperature is needed, a thin layer of sapphire, which is transparent but has a high thermal conductivity, may be used to separate the cooling water from the helium layer.

Fifth, it is important to understand the design basis for the resonator to prevent the reciprocating motion of the glass slab from causing motion of the output laser beam. The design illustrated in FIG. 3 results in the position and direction of the output beam being dependent only on the mirror orientation, and not on the reciprocating motion of the glass slab. This is accomplished by making the high reflectivity mirror 70 flat, while the output mirror 60 is curved. With this configuration, the beam direction is determined entirely by the orientation of the back mirror 70, while the beam position is determined entirely by the front mirror 60. As long as the slab remains a rigid body, its motion can only change the position of the beam, not its direction. Thus, motion of the slab simply moves the spot around on the back mirror 70, while the beam exits the front mirror 60 with fixed position and direction. This stability means that the slab does not result in increased difficulty in focusing the laser to a small, stable spot.

Last, it is important to understand the laser efficiency and optimum output coupling for the preferred embodiment of the present invention can be calculated from the usual laser equations. The one consideration that may be unusual is the inclusion of the thermal population of the lower laser level. At high dopings and moderate temperatures, this leads to a significant reduction in the gain and available power. In order to calculate the efficiency of a laser, one must know the rate at which energy is being pumped into the upper laser level (storage efficiency) and how well the energy is extracted from the upper laser level (extraction efficiency). Since data exists indicating that storage efficiencies as high as 8.5 percent are possible with very highly doped glass, it is not unreasonable to assume that 3.5 percent of the flash lamp energy is stored in the upper laser level. The extraction efficiency may be calculated by first calculating the steady state population inversion, and from that the small signal gain. It is then possible to calculate the loss due to scattering from the glass. Then, the optimum transmittance of the output mirror is calculated and, finally, the laser output. The steady state upper level population is given by $$N_u = Pt/h\nu$$

where P is the rate of energy storage in watts/centimeter$^3$, t is the upper level lifetime in seconds, and h$\nu$ is the energy of laser transition in joules.

With 50,000 watts of average flash lamp power, a 3.5 percent storage efficiency, and a 10 percent flash lamp duty cycle, energy is stored at the rate of 17,500 watts. The volume into which the energy is stored is 30 centimeters $\times$ 0.65 centimeters $\times$ 0.7 centimeters for a value of P=1280 watts/centimeter$^3$. For the 1.06 um transition in LHG-5, reference to Table 2 shows that $N_u = 2.0 \times 10^{18}$/centimeters$^3$. The steady lower laser level population is given by $$N_L = N e^{-E_L/KT}$$

where $N_L$ is the low level population density in centimeters$^{-3}$, N is the total density of Nd+ ions in centimeters$^{-3}$, $E_L$ is the energy of lower level above ground state in joules, K is Boltzman's constant in joules/degree Kelvin, and T is the temperature of the slab in degrees Kelvin. With the slab at 360 degrees Kelvin, $N_L = 0.27 \times 10^{18}$/centimeter$^3$.

Gain is calculated as $$g = (N_u - N_L)\sigma L$$

where g is the gain per round trip, $\sigma$ is the transition cross section in centimeters$^2$, and L is the round trip distance through the gain medium in centimeters.

The beam goes through the slab twice in one round trip. Because of the 45 degree zig-zag, the beam travels a total distance of the square root of twice the slab length. In the present design, the length over which the beam sees gain is given by L=30 cm $\times$ 2 $\times$ 2 = 85 centimeters.

The loss due to scattering in 85 centimeters is 0.085. Thus, the net gain is 5.0, representing a multiplicative gain of 150. The optimum output can be estimated by the equation $$C = (\sqrt{gl} - l)/(l+1)$$

where l is the loss per round trip and C is the coupling or transmittance of the output mirror. The result for the present design IS C=0.57. Thus, a 50 percent output mirror is quite good. The total output power is estimated using $$P_{out} = P_{available}((C/(1+g)) - (C/g))$$

where $P_{out}$ is the output power in watts and $P_{available}$ is the power if all atoms in inversion gave energy to the output beam. For the present design, this results in $P_{out} = 0.77 P_{available}$. The available power is not the full 1750 watts, but rather is reduced because of the significant lower laser level population. The number of upper state atoms from which energy can be extracted is reduced by the number of atoms in the lower level. This leads to $P_{available} = 0.83 P_{stored}$. When this result is multiplied by the 0.77 extraction efficiency, the result is an output of 1160 watts. If a storage efficiency of 3.0 percent is assumed, the resulting power output is 950 watts.

It is believed that a one kilowatt average power Nd:glass laser constructed in accordance with preferred embodiment described herein satisfies an important need in the industrial marketplace. The major component of cost is that of the required 50,000 watt power supply. Efficiencies of two percent or more are possible. If the evidence for an eight percent storage efficiency in highly doped glass is accurate, overall efficiencies approaching four percent are not unrealistic. Repetition rates approximating 330 hertz are not difficult to realize. It is believed that beam stability and focusability could be as good as for lasers without moving parts. In addition, the laser is compact. The head has a longest dimension of one meter, and the power supply is no larger than one cubic meter. Absorption of the 1.06 micron radiation is much better in metal working applications than in the case of $CO_2$ lasers.

I claim:

1. In a solid state laser of the type characterized by a solid member of lasant meterial having a pair of opposed major faces between which optical lasant energy generated within said member is caused to be internally reflected in a zig-zag path, the improvement comprising:

optical pumping means for passing optical pumping radiation through a selected region of at least one of said major faces and into said member for optically pumping said lasant material; and moving means for imparting cyclical relative motion between said member of lasant material and the selected region of said member which is illuminated by said optical pumping radiation so as to distribute the heat generated in said member of lasant material by said optical pumping radiation approximately evenly throughout the member of lasant material, whereby thermally induced depolarization and focusing effects are reduced in use.

2. The laser of claim 1 wherein said member of lasant material is of a slab geometry with the spacing between the opposed major faces thereof being less than the breadth of each of said major faces.

3. The laser of claim 1 wherein the solid state lasant material comprises neodymium doped glass.

4. The laser of claim 14 wherein said moving means imparts reciprocal translation between said member of lasant material and the selected region of said member which is illuminated by said optical pumping means.

5. The laser of claim 1 wherein said moving means imparts rotary motion between said member of lasant material and the selected region of said member of which is illuminated by said optical pumping means.

6. The laser of claim 1 including:

cooling means adjacent the member of lasant material for conducting heat away therefrom;

said cooling means including a plate of thermally conductive material positioned adjacent at least one of said major faces of the member of lasant material; and a coupling layer of gaseous medium interposed between a major face of said lasant member and the adjacent plate of thermally conductive material for providing thermal conduction therebetween.

7. The laser of claim 6 including means for circulating a coolant through said plate of thermally conductive material.

8. The laser of claim 1 including:

prism means positioned adjacent one of said major faces of said member of lasant material for coupling a laser beam out of the member of lasant material; and an index matching fluid film interposed between said prism means and the adjacent one of said major faces of the member of solid state lasant material.

* * * * *